April 1, 1930.  J. H. REICHART  1,752,457

POP CORN MACHINE

Filed Sept. 15, 1928

INVENTOR.
JAMES H. REICHART.
BY
ATTORNEYS.

Patented Apr. 1, 1930

1,752,457

UNITED STATES PATENT OFFICE

JAMES H. REICHART, OF MUNCIE, INDIANA

POP-CORN MACHINE

Application filed September 15, 1928. Serial No. 306,175.

The object of this invention is to provide a corn popping machine for the commercial production of pop corn which is relatively compact and simple in construction and provided with several improvements in the operation thereon.

One feature of the invention resides in the provision of a popping plate that slopes downwardly gradually from the margin toward the center thereof, whereby the unpopped corn will tend to roll toward the central and more heated portion thereof. Also said popping plate is provided with a marginal flange which surrounds and is spaced from the upper part of the heating element so that any fluid, like melted butter, will drip from said margin to the floor of the cabinet without injuring and disfiguring the wall of the heating element or other part of the machine below the popping plate.

A further advantage of the dished popping plate lies in the centrally positioned head extending upwardly therefrom and surrounding the shaft, for preventing grease or the like which may accumulate on the popping plate from escaping around the shaft. This arrangement eliminates the necessity of providing a packing at this point which is of material value in the economical production of the machine.

Another feature of the invention consists in an agitating and discharging element which is immediately above the popping plate and preferably extends centrally through a shaft capable of rotating in opposite directions, the agitating and discharging fingers curving reversely of each other and with one or both of the fingers bent upward somewhat from the popping plate for the purposes and advantages in operation as hereinafter explained.

Another feature of the invention consists in providing a cover for said popping plate that is non-rotatable and vertically movable with respect to said plate by the rotation of the shaft, so as to permit the discharge of the popped corn, said cover having a plurality of screened windows positioned above the side wall thereof.

The full nature of the invention will be understood from the accompanying drawings and the following description and claims.

Figure 1:
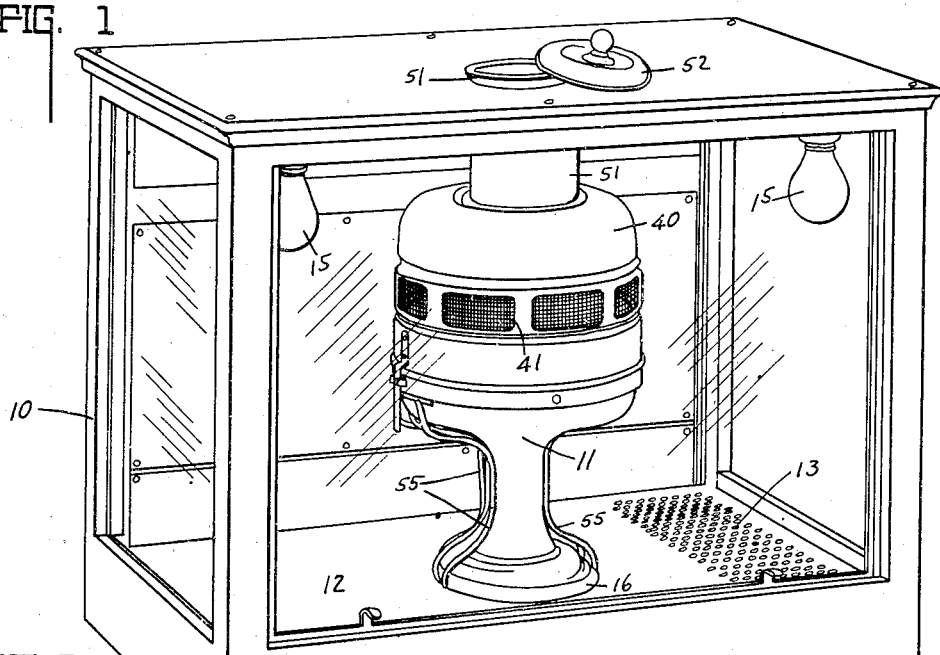
Figure 2:
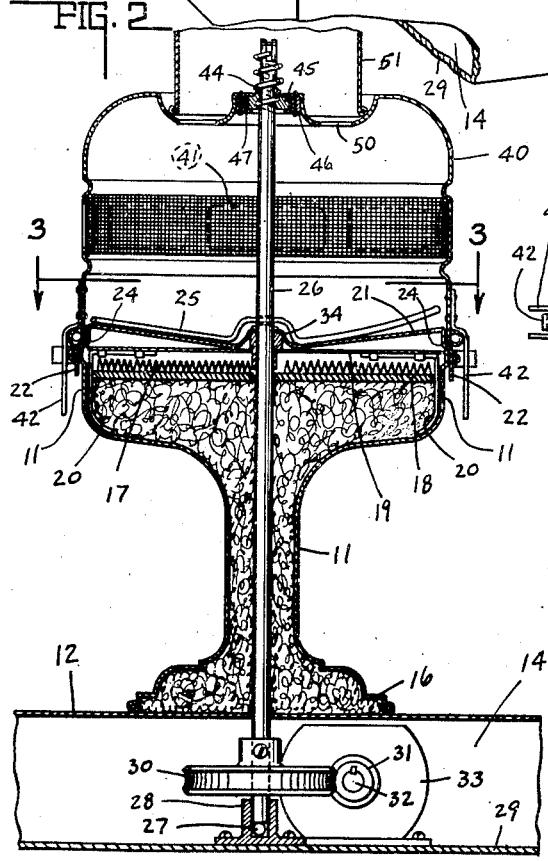
Figure 3:
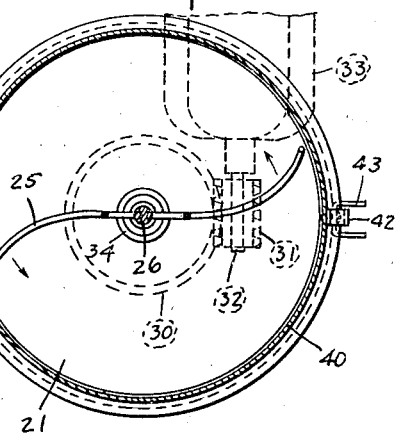

In the drawings Fig. 1 is a perspective view of the corn popping apparatus, with one corner partially broken away. Fig. 2 is a central vertical section of the corn popping apparatus with parts broken away. Fig. 3 is a horizontal section on the line 3—3 of Fig. 2.

There is shown herein a cabinet 10 containing a corn popper 11. Said cabinet is rectangular and its walls are made of glass to render the contents visible. The function of the cabinet is not only to contain and disclose the corn popping machine but to contain the popped corn. The floor 12 of the cabinet has a perforated portion 13 through which the unpopped grains may pass below to the chamber 14. The perforated portion is shown at one end of the floor 12, although it is not necessarily limited thereto. Suitable electric lamps 15 are contained within the cabinet.

The supporting pedestal 11 is shown in central vertical section in Fig. 2 having a base 16 secured to the floor 12 of the cabinet 10. The base 16 and pedestal 11 are filled with suitable insulating material, such as mineral wool. The heating element is of the usual character having the resistance wires 17, non-conducting plate 18 below, and the cover plate 19 above. Said cover plate is held in place by the spring arms 20.

The popping plate 21 is superimposed upon the heating element, and is stationary. It is dish-shaped or depressed toward the center as shown so that the tendency of the unpopped corn is to roll toward the central and more heated portion and not to readily move outward and escape over the margin of the popping plate. In the center of the depressed dish-shaped popping plate there is an upwardly extending head through which the shaft 26 extends. Said head protects the shaft from contact with any liquid such as butter which may accumulate in the central depressed portion of the plate so as to prevent its leaking about the shaft, and thereby avoiding the necessity of providing packing between the shaft and plate. The device, therefore, is adapted to so-called "wet-popping" as well as dry popping.

The margin of the popping plate has a downwardly extending rim 22 creased about midway at 24, whereby it rests on the top of the supporting pedestal 11. The lower portion of the rim extends downward and is spaced from the wall of the pedestal so that no material discharged from the popping plate discharges thereon. This is particularly adapted to keep the melted butter or the like from running down on the wall of the pedestal 11 and disfiguring the heater and entire device. The melted butter drops from the lower edge of the rim 22 down to the bottom of the cabinet. This rim 22 also prevents corn grits, chaff, grains and the like from getting into the mineral wool. This might result from capillary attraction which is quite frequent in so called wet-popping were it not for the provision of the guard flange or rim 22.

Upon the popper plate the agitating and discharging fingers 25 are located. They consist of a single wire extending centrally through the shaft 26 and projecting almost to the rim of the popping plate. The agitating and discharging fingers are rotated or actuated by shaft 26 which extends centrally through the device and down below the bottom 12 of the cabinet into the chamber 14 and rests on a ball bearing 27 in a bearing socket 28 secured to the bottom 29 of the chamber 14. The shaft 26 is rotated by the worm wheel 30 which meshes with the worm 31 on the shaft 32 of an electric motor 33 located in the chamber 14. The motor is of a common type which is readily reversible so that the shaft 26 can be turned in either direction. The shaft 26 has secured thereto a support 34 extending upwardly to the upwardly extending head formed centrally of the popping plate for supporting and positioning the popping plate thereon as shown in Fig. 2.

The agitating and discharging fingers 25 are peculiar in form. Near the shaft 26 each finger is bent downwardly appreciably so as to rest on the popping plate near the middle portion thereof. The fingers are curved in opposite directions, the outer ends of the fingers extending in advance of the middle portions of the two fingers, and one of the fingers lying rather flat on the popping plate while the outer half of the other finger is bent upward so that its extreme outer end is about one-half an inch from the popping plate. While the drawing shows one finger lying flat on the popping plate and the other finger in an elevated position, in actual practice either of the fingers may lie flat on the popping plate, but when either finger lies flat thereon, the other finger will be elevated, or both fingers can be partially elevated.

In operation, this element assumes various positions although normally one finger lies flat while the other projects upward as shown. The principal reason for so constructing the agitator is that if a grain of corn wedges under that part of the agitator lying close to the popping plate, it will raise up over that grain of corn because of the fact that its opposite end, like a teeter-board, can go down. Suppose now that the opposite end which previously was raised from the plate, is now held low, or to the plate, and likewise a grain of corn forms under it. The teeter operation will again take place. Or, suppose, for example, that two grains of corn are caught under each of the ends of the agitator simultaneously. Unless the pressure of each grain is exactly the same, the one having the greatest pressure will force the opposite grain from under the agitator and it is again free to operate in a teeter-board fashion.

The finger lying flat agitates the unpopped grains of corn and allows none to pass, whereas the other elevated finger acts on the popped corn. During the popping part of the operation of the machine, the fingers 25 are turned counter-clockwise in the machine as shown. After a charge of corn is popped, the shaft 26 is reversed and the fingers 25 rotate in the opposite direction for discharging the popped corn over the margin of the popping plate into the cabinet.

In this popped corn discharging movement, the middle curved portions of the fingers move in advance of the ends, which enables the ends to more rapidly discharge the popped corn.

A cover or hood 40 surrounds the popping plate during the popping operation, as shown in Fig. 2, for retaining the popped and unpopped corn upon the popping plate, but it is moved to elevated position during the discharging of the popped corn over the margin of the popping plate. Said cover is provided with screened windows 41 in the wall thereof to render the interior visible, and is held in place in its closed position by fingers 42 extending downwardly from the lower edge thereof into position between a pair of radially extending stationary fingers 43. This prevents any rotary movement of the cover or hood 40 but permits vertical movement thereof for closing and opening the same.

The cover 40 is maintained in closed position when the shaft 26 is rotated in one direction and is nonrotatably lifted from the popping plate when the shaft is rotated in the opposite direction. This is accomplished by providing a thread 44 on the upper end of the shaft which engages in the internal threaded portion of an inner clutch member 45. Said inner clutch member 45 is mounted in an outer clutch member 46 which is secured directly to the underside of the cover 40. Said clutch members 45 and 46 are clutched together by the spring clutch 47 when the member 45 tends to move in one direction, and are disengaged by the clutch 47 when moved in the opposite direction. By means of this arrangement, when the threads 44 of the shaft 26 are rotated in one direction, the clutch member 45 is free to rotate independently of the clutch member 46. When the shaft is rotated in the opposite direction, the clutch member 45 will be held stationary by the clutching action thereof with the member 46 so that the screw threads of the shaft will rotate relative thereto and screw the inner member 45 upwardly thereon. This results in the lifting of the cover 40 upwardly from the popping plate for permitting the discharge of the popped corn.

When the popping part of the process is ended, a sudden reversal of the motor 33 will cause the reversal in the rotation of the shaft 26, and the spiral wire or thread 44 will pick up the hood and elevate it for an inch or more which will leave ample clearance between the lower edge of the hood and the popping plate for the discharge of the popped corn. The hood is thereby elevated on the shaft 26 to a point above the spiral wire or thread 44 so that the fingers 25 can be rotated until the popped corn has been discharged. Hence the machine is operated in one direction for popping and in the opposite direction for discharging the popped corn, and the position of the cover or hood 40 is determined by the direction of movement of the motor and shaft 26. This makes a very easily operated machine and the operation during the popping or discharge may be as long as desired. As soon as the popped corn is discharged, a reversing of the motor 33 and shaft 26 will, through the spiral wire or thread 44, forcibly move the cover or hood downward to closing position.

The unpopped corn is charged through the hood and into the machine on the popping plate through the opening 50 in the top of the cover or hood, and, to facilitate in this, the top of the cover or hood is hopper-shaped as shown in Fig. 2, and a tubular flue 51 provided with a lid 52 rests thereon and extends above the cabinet.

The charge of corn is introduced through said tubular flue 51 and said tubular flue and openings 50 in the top of the hood or cover cause a satisfactory exit of the heated gases and fumes from the popping chamber. Hence the parts 40, 50 and 51 perform a double function, that of charging the hopper and that of ventilating the same. If the outer wall of the heating portion 11 becomes hot, suitable guards 55 may be provided as shown in Fig. 1.

Attention is also directed to that feature of the invention provided in the closed metal cover having apertures spaced from each other and extending about the wall thereof intermediate the top and bottom. Said apertures are closed by a mesh screen which permits observation of the corn popping therein and permits the escape of the aroma of the popping corn while preventing the escape of the corn. In this connection it will be noted that the lower and upper portions of the cover sufficiently enclose the popping plate to retain a substantial amount of the heat.

The invention claimed is:

1. A corn popping machine including a support provided with a heater element, and a popping plate thereon with a marginal downwardly extending flange overlapping and extending beyond said support so that material discharged over the margin of the popper plate will not come in contact with the said support.

2. A corn popping machine including a support provided with a heater element the upper portion of which has an outwardly projecting rim portion, a popping plate mounted above said support having a marginal flange provided with an annular bead adapted to rest on said support, the lower portion of said flange extending downward beyond said support so that material being discharged over the margin of the popping plate will not come in contact with said support, and a top cover adapted to be supported by said bead.

3. A corn popping machine having the top of the cover annularly depressed and provided with a plurality of apertures therein, a corn discharging tube resting upon said depressed portion of the cover and surrounding said apertures for receiving a charge of unpopped corn to be popped, a cabinet in which said machine is mounted having a top through which said tube extends and a movable lid for closing the upper end thereof.

4. A corn popping machine including a popping plate, a cover mounted thereover, a shaft extending centrally and vertically through said popping plate and cover, screw threads on the upper end of said shaft, a clutch member secured to said cover plate, and a second clutch member gripped by said first clutch member, when moved in one direction and freed therefrom when moved in the other direction, said second clutch member being provided with screw threads engaged by the screw threads on said shaft, whereby upon rotating said shaft in one direction said second member will be held stationary with respect to said shaft and carried upwardly by said screw threads for raising the cover, and upon said shaft being rotated in the other direction said clutch member will be screwed downwardly and freely rotated by said shaft with respect to said cover, whereby the latter will be maintained in lowered position.

5. A corn popping machine including a dished popping plate having a surface thereof sloping downwardly toward the center, an upwardly protruding head formed in the center of said plate, and a shaft extending upwardly through said head and rotatable relative thereto, said head being adapted to prevent grease or the like formed on said plate from contacting the said shaft and escaping along the surface thereof.

6. A corn popping machine including a popping plate, a heating element therefor, a closure for said plate having a plurality of relatively small apertures extending about the peripheral wall intermediate the upper and lower portions thereof, and a mesh screen mounted in each of said apertures for closing the same and preventing the passage of the popping corn therethrough while permitting the escape of the aroma therefrom and observation thereof.

7. A corn popping machine including a popping plate, a cover mounted over said popping plate, a grain receptacle thereabove discharging centrally through the cover to the plate, a shaft extending upwardly and centrally of and through said popping plate, and means on said shaft for elevating said cover from said popping plate when the shaft is rotated in one direction.

8. A corn popping machine including a stationary popping plate, a vertical shaft extending centrally thereof, and an agitating and discharging element extending radially from said shaft immediately above the popping plate, the ends of said element being curved in opposite directions, half of said element substantially conforming to the adjacent surface of the plate, and the outer portion of the other half of said element being curved upward above the popping plate so as not to lie thereon.

9. A corn popping machine including a stationary heating popping plate, a vertically movable non-rotatable cover above the popping plate, a rotatable shaft, means on said shaft for moving said cover vertically when the shaft is rotated in one direction, an agitating end discharging element connected with and extending radially from said shaft and located immediately above the popping plate, said element having oppositely extending fingers reversely curved with respect to each other whereby the ends of said element will extend in advance of their movement during the corn popping action for agitating the grains and corn during the same and said outer ends will extend rearwardly during the discharging action for discharging the popped corn from the plate and from beneath the cover when the latter is elevated, and means for rotating said shaft in opposite directions for opposite rotation of the agitating and discharging element and for elevating and lowering movement of the cover.

10. A corn popping machine including a heater element, a stationary popping plate above the same, a vertically movable non-rotatable cover above the popping plate, a rotatable shaft, means on the upper end of said shaft for engaging and moving said cover vertically when rotated in one direction, an agitating and discharging element connecting with and extending radially from said shaft located above the popping plate, whereby when the shaft is operated in one direction, the cover will be closed and when operated in the opposite direction the cover will be opened, the top of said cover being annularly depressed and having charging openings therein, and a charging tube resting upon said depressed portion of the cover and surrounding said openings for receiving a charge of unpopped corn to be popped.

11. A corn popping machine including a heater element, a stationary popping plate above the same, a vertically movable non-rotatable cover above the popping plate, a rotatable shaft, means on the upper end of said shaft for engaging and moving said cover vertically when rotated in one direction, an agitating and discharging element connecting with and extending radially from said shaft located above the popping plate, whereby when the shaft is operated in one direction, the cover will be closed and when operated in the opposite direction the cover will be opened, the top of said cover being annularly depressed and having charging openings therein, a charging tube resting upon said depressed portion of the cover and surrounding said openings for receiving a charge of unpopped corn to be popped, a cabinet in which said corn popping machine is mounted having a top through which said charging tube extends, and a lid for closing the upper end thereof.

12. In a corn popping machine, the combination of a ventilated corn popping chamber including an apertured cover, a shaft extending into said chamber from said cover portion and rotatable in said chamber, a metallic heating plate forming the bottom of the popping chamber, a lateral rod portion rigid with the shaft and positioned adjacent said heating plate for stirring purposes, a chamber formed beneath the popping chamber, a second metallic plate positioned beneath the first metallic plate, an insulation plate in spaced relation therewith, and a heating element supported by said insulation plate and positioned between the popping plate and the insulation plate.

In witness whereof, I have hereunto affixed my signature.

JAMES H. REICHART.